(12) United States Patent
Tylutki et al.

(10) Patent No.: US 8,640,441 B2
(45) Date of Patent: Feb. 4, 2014

(54) METHOD OF MONITORING A DIFFERENTIAL PRESSURE SENSOR OF AN EXHAUST GAS TREATMENT SYSTEM

(75) Inventors: Vincent J. Tylutki, Livonia, MI (US); Benjamin Radke, Waterford, MI (US); Janean E. Kowalkowski, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 57 days.

(21) Appl. No.: 13/490,868

(22) Filed: Jun. 7, 2012

(65) Prior Publication Data

US 2013/0327018 A1    Dec. 12, 2013

(51) Int. Cl.
    *F01N 3/00*    (2006.01)
(52) U.S. Cl.
    USPC .............................. 60/276; 60/277; 73/861.42
(58) Field of Classification Search
    USPC ................................. 60/276, 277; 73/861.42
    See application file for complete search history.

(56) References Cited

U.S. PATENT DOCUMENTS

| | | | | |
|---|---|---|---|---|
| 6,850,833 | B1* | 2/2005 | Wang et al. | 701/108 |
| 7,396,389 | B2* | 7/2008 | Kariya et al. | 95/273 |
| 2004/0200271 | A1* | 10/2004 | van Nieuwstadt | 73/118.1 |
| 2009/0193904 | A1* | 8/2009 | Takahashi et al. | 73/716 |
| 2010/0018186 | A1* | 1/2010 | Shibata et al. | 60/277 |
| 2011/0209560 | A1* | 9/2011 | Ito et al. | 73/861.42 |

* cited by examiner

*Primary Examiner* — Thomas Denion
*Assistant Examiner* — Jason Shanske
(74) *Attorney, Agent, or Firm* — Quinn Law Group, PLLC

(57) ABSTRACT

A method of monitoring a differential pressure sensor of an exhaust gas aftertreatment system includes sensing a learned value (n−1, n, n+1, n+2, etc.) of the differential pressure sensor for each after-run occurrence of the vehicle, and calculating an absolute value of a rate of change between a current (n) learned value of the differential pressure sensor and a previous (n−1) learned value of the differential pressure sensor. The absolute value of the rate of change is compared to a threshold pressure value to determine if the absolute value of the rate of change is greater than the threshold pressure value or is less than the threshold pressure value. A fault in the differential pressure sensor is signaled when the absolute value of the rate of change of the learned values is greater than the threshold pressure value.

20 Claims, 2 Drawing Sheets

METHOD OF MONITORING A DIFFERENTIAL PRESSURE SENSOR OF AN EXHAUST GAS TREATMENT SYSTEM

TECHNICAL FIELD

The invention generally relates to a method of monitoring a differential pressure sensor of an exhaust gas aftertreatment system of a vehicle.

BACKGROUND

An exhaust gas aftertreatment system of a vehicle may include a differential pressure sensor to sense the exhaust pressure within the treatment system. The differential pressure sensor sends a signal to a control module, which uses the signal for various calculations and/or to determine initiation of certain events, such as but not limited to regeneration of a Diesel Particulate Filter (DPF).

Vehicles will often include On-Board Diagnostic (OBD) algorithms to determine if various components are functioning properly, or may be malfunctioning. For example, vehicles may include an OBD algorithm to determine if the DPF is functioning properly, or is malfunctioning. The OBD algorithm for the DPF uses the signal from the differential pressure sensor in the exhaust gas aftertreatment system, along with other inputs, to determine if the DPF is functioning properly or is malfunctioning. As such, a malfunction in the differential pressure sensor may cause an incorrect assessment of the DPF's functionality.

Vehicles may further include an OBD algorithm to determine if the differential pressure sensor is functioning properly, or is malfunctioning. However, it is possible that the differential pressure sensor may be malfunctioning, for example providing erratic pressure signals that are otherwise within an allowable range of pressure signals, yet not fail the OBD algorithm for the differential pressure sensor. Such an occurrence, when the OBD algorithm passes a differential pressure sensor that is providing erratic pressure signals, may cause an incorrect assessment of the DPF diagnostic algorithm, which may cause unnecessary replacement of the more expensive DPF instead of the less costly differential pressure sensor, or failure to detect a faulty DPF.

SUMMARY

A method of monitoring a differential pressure sensor of an exhaust gas aftertreatment system of a vehicle, used to treat a flow of exhaust gas from an engine, is provided. The method includes sensing a learned value (n−1, n, n+1, n+2, etc.) of the differential pressure sensor for each after-run occurrence of the vehicle, and calculating an absolute value of a rate of change between a current (n) learned value of the differential pressure sensor and a previous (n−1) learned value of the differential pressure sensor. The absolute value of the rate of change of the learned values of the differential pressure sensor is compared to a threshold pressure value to determine if the absolute value of the rate of change of the learned values is greater than the threshold pressure value or is less than the threshold pressure value. A fault in the differential pressure sensor is signaled when the absolute value of the rate of change of the learned values is greater than the threshold pressure value.

A method of detecting a malfunction of a differential pressure sensor of an exhaust gas aftertreatment system of a vehicle, used to treat a flow of exhaust gas from an engine, is also provided. The method includes providing a control module operable to monitor the differential pressure sensor. The control module is configured for sensing a learned value (n−1, n, n+1, n+2, etc.) of the differential pressure sensor for each after-run occurrence of the vehicle in which no inhibiting conditions are detected. A numerical difference between a current (n) learned value of the differential pressure sensor and a previous (n−1) learned value of the differential pressure sensor is calculated. An absolute value of the numerical difference between the current (n) learned value of the differential pressure sensor and the previous (n−1) learned value of the differential pressure sensor is calculated to define an absolute value of a rate of change between the learned values (n, n−1) of the differential pressure sensor. The absolute value of the rate of change of the learned values of the differential pressure sensor is compared to a threshold pressure value to determine if the absolute value of the rate of change of the learned values is greater than the threshold pressure value or is less than the threshold pressure value. A fault in the differential pressure sensor is signaled when the absolute value of the rate of change of the learned values is greater than the threshold pressure value.

Accordingly, a malfunctioning differential pressure sensor may be identified based on the absolute value of the rate of change of the learned values of the differential pressure sensor. The learned values from a properly functioning differential pressure signal should remain approximately constant over time, i.e., within a pre-defined offset tolerance, yet may slowly increase. Accordingly, the learned values from the differential pressure sensor may fall within an allowable range of pressures. A malfunctioning differential pressure sensor may provide erratic learned values that are still within the allowable range of pressures. By comparing the rate of change of the learned values to the threshold pressure value, the malfunctioning differential pressure may be identified, even though the individual learned values are within the allowable range of pressures.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
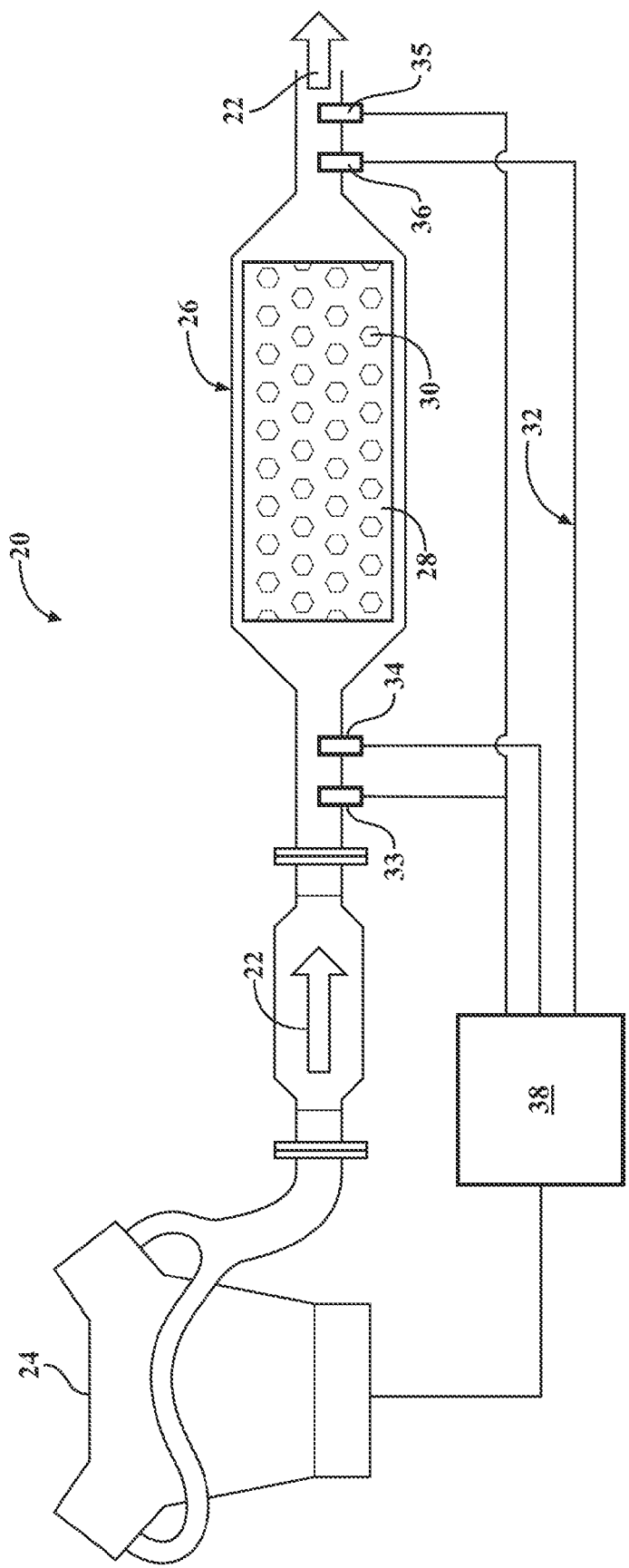
FIG. 1 is a schematic diagram of an engine and an exhaust gas aftertreatment system for treating exhaust gas from the engine.

Referring to FIG. 1, wherein like numerals indicate like parts throughout the several views, an exhaust gas aftertreatment system for a vehicle is shown generally at 20. The exhaust gas aftertreatment system 20 directs and treats exhaust gas, generally indicated by flow arrows 22, from an internal combustion engine 24. The engine 24 preferably includes a diesel engine, but may alternatively include some other style of engine 24, such as but not limited to a gasoline engine.

The exhaust gas aftertreatment system 20 includes a particulate filter 26. The particulate filter 26 filters particulate matter, i.e., soot, from the exhaust gas of the engine 24. The particulate filter 26 may include one or more substrates 28 that define a plurality of apertures 30, through which the exhaust gas must flow. The particulate matter collects on the substrates 28 as the exhaust gas flows through the apertures 30. The particulate filter 26 is occasionally regenerated to remove the collected particulate matter. Regeneration of the particulate filter 26 includes heating the particulate filter 26 to a temperature sufficient to burn the collected particulate matter for a time sufficient to completely burn all of the particulate matter from the substrate 28. Burning the particulate matter converts the particulate matter to carbon dioxide that dissipates into the atmosphere.

The exhaust gas aftertreatment system 20 further includes a differential pressure sensor 32 and at least one temperature sensor 34, 36. The differential pressure sensor 32 senses a pressure within the exhaust gas aftertreatment system 20, and sends a signal indicative of the sensed pressure to a control module 38, described in greater detail below. The differential pressure sensor 32 includes a first line 33 disposed upstream of the particulate filter 26, and a second line 35 disposed downstream of the particulate filter 26. The control module 38 uses the sensed pressure upstream and downstream from the particulate filter 26, from the first line 33 and the second line 35 respectively, to calculate a difference in pressure across the particulate filter 26. The control module 38 uses the sensed difference in pressure from the differential pressure sensor 32 as an input into a soot model that estimates the status of the particulate filter 26. When the soot model estimates that the particulate filter 26 requires regeneration, the control module 38 controls the operation of the engine 24 and/or exhaust gas aftertreatment system 20 to regenerate the particulate filter 26.

As shown, the at least one temperature sensor 34, 36 includes a first temperature sensor 34 and a second temperature sensor 36. The first temperature sensor 34 is disposed upstream of the particulate filter 26, and the second temperature sensor 36 is disposed downstream of the particulate filter 26. Each of the first temperature sensor 34 and the second temperature sensor 36 sends a signal to the control module 38 that indicates the temperature of the exhaust gas within exhaust gas aftertreatment system 20 disposed upstream of the particulate filter 26 and downstream of the particulate filter 26 respectively. The control module 38 uses the sensed temperature of the exhaust gas from both the first temperature sensor 34 and the second temperature sensor 36 as inputs into the soot model, and to monitor the regeneration of the particulate filter 26.

As noted above, the vehicle includes a control module 38 to monitor and control the operation of the exhaust gas aftertreatment system 20, including monitoring the operation and/or performance of the differential pressure sensor 32. The control module 38 may include a computer and/or processor, and include all software, hardware, memory, algorithms, connections, sensors, etc., necessary to monitor and control the exhaust gas aftertreatment system 20 and the differential pressure sensor 32. As such, a method, described below and generally shown in FIG. 2 at 40, may be embodied as a program operable on the control module 38. It should be appreciated that the control module 38 may include any device capable of analyzing data from various sensors, comparing data, making the necessary decisions required to control the exhaust gas aftertreatment system 20, as well as monitoring the differential pressure sensor 32.

Figure 2:
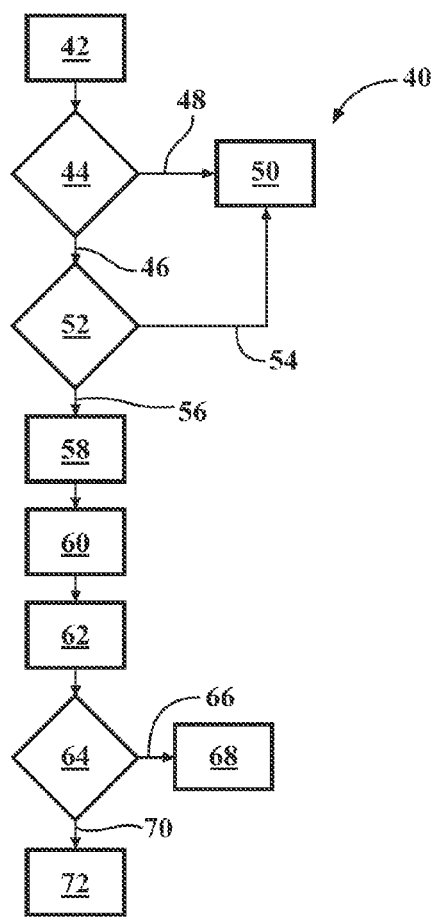
FIG. 2 is a flowchart providing a method of monitoring the differential pressure sensor to detect a fault in the differential pressure sensor.

Referring to FIG. 2, a method of monitoring the differential pressure sensor 32, and more specifically a method of detecting a malfunction of the differential pressure sensor 32, is generally shown at 40. The method includes providing the control module 38, indicated by box 42, which is operable to monitor and control the operation of the exhaust gas aftertreatment system 20 and the differential pressure sensor 32. As noted above, the control module 38 includes all software, hardware, memory, algorithms, connections, sensors, etc. necessary to monitor and control the differential pressure sensor 32. The control module 38 is configured to perform the various tasks of the method described below.

The control module 38 is operable to detect the existence of at least one inhibiting condition, indicated by box 44, prior to enabling a monitoring algorithm. The monitoring algorithm, described in detail below, monitors the operation of the differential pressure sensor 32 to identify a fault or malfunction in the differential pressure sensor 32. The monitoring algorithm is only started in the absence of any inhibiting conditions that may affect the outcome of the monitoring algorithm. The absence of any inhibiting conditions is generally indicated at 46 in FIG. 2. The existence of any inhibiting conditions is generally indicated at 48 in FIG. 2. For example, an inhibiting condition may include but is not limited to a temperature of exhaust gas within the exhaust gas aftertreatment system 20 being outside a pre-defined range of temperatures. The temperature of the exhaust gas may be sensed in any suitable manner, such as by the first temperature sensor 34 and/or the second temperature sensor 36. If the temperature of the exhaust gas is outside the pre-defined range of temperatures, then the inhibiting condition exists, and the control module 38 will not start the monitoring algorithm, indicated by box 50. The pre-defined range of temperatures may include a temperature range of between 0° C. and 300° C. It should be appreciated that the temperature range may differ from the exemplary range provided herein. Accordingly, if the temperature of the exhaust gas within the exhaust gas aftertreatment system 20 is between the range of 0° C. and 300° C., then the inhibiting condition does not exist, and the control module 38 may start the monitoring algorithm in the absence of any other inhibiting conditions. In contrast, if the temperature of the exhaust gas within the exhaust gas aftertreatment system 20 is outside the range of 0° C. and 300° C., then the inhibiting condition does exist, and the control module 38 may not start the monitoring algorithm, i.e., the monitoring algorithm is disabled.

Another inhibiting condition may include, but is not limited to, an ambient air temperature being less than a pre-defined minimum temperature. The ambient air temperature may be sensed and/or communicated to the control module 38 in any suitable manner, such as sensing the ambient air temperature with a sensor, or querying another control module 38 of the vehicle for the ambient air temperature or a model of ambient temperature. The pre-defined minimum ambient air temperature may include, but is not limited to, a temperature equal to −40° C. It should be appreciated that the pre-defined minimum ambient air temperature may differ from the exemplary minimum temperature provided herein. Accordingly, if the ambient air temperature is greater than −40° C., then the inhibiting condition does not exist, and the control module 38 may start the monitoring algorithm in the absence of any other inhibiting conditions. In contrast, if the ambient air temperature is less than −40° C., then the inhibiting condition does exist, and the control module 38 may not start the monitoring algorithm, i.e., the monitoring algorithm is disabled.

The monitoring algorithm may be enabled when the existence of any inhibiting conditions is not detected, generally indicated at 46, and the control module 38 determines that the vehicle is currently disposed in an after-run state, i.e., the engine 24 has previously been turned off within a pre-defined time period, and at least one previous (n−i) learned value of the differential pressure sensor 32 is saved in the memory of the control module 38 and is less than a threshold pressure value 92, described in greater detail below, generally indicated by box 52. Accordingly, if the vehicle is not currently in an after-run state, or if at least one previous learned value is not saved in the memory of the control module 38, generally indicated at 54, then the monitoring algorithm is disabled, indicated by box 50. Alternatively, if the vehicle is currently in an after-run state, and at least one previous learned value is saved in the memory of the control module 38, indicated at 56, then the monitoring algorithm is enabled, generally indicated by box 58. As used herein, an after run event is defined to include the occurrence of an event within a time period after the vehicle has been turned off, i.e., the occurrence of an event after the engine 24 stops running. An after run state is defined herein as being within the time period after the vehicle has been turned off in which an after run event my occur.

Once the monitoring algorithm is enabled, a learned value of the differential pressure sensor 32 is sensed for each after-run occurrence of the vehicle, generally indicated by box 60. The sensed learned value of the differential pressure sensor 32 is the pressure reading from the differential pressure sensor 32. The control module 38 saves each learned value of the differential pressure sensor 32 in the memory of the control module 38 as an individual sample (n−1, n, n+1, n+2, etc.). As such, the control module 38 saves one learned value from the differential pressure sensor 32 for each after-run occurrence.

An absolute value of a rate of change between a current (n) learned value of the differential pressure sensor 32 and a previous (n−1) learned value of the differential pressure sensor 32 is then calculated, generally indicated by box 62. Calculating the absolute value of the rate of change of the learned values (n, n−1) of the differential pressure sensor 32 includes calculating a numerical difference between the current (n) learned value of the differential pressure sensor 32 and the previous (n−1) learned value of the differential pressure sensor 32, i.e., subtracting the current (n) learned value from the previous (n−1) learned value. For example, if the current (n) learned value includes a pressure of negative one hPa (−1 hPa), and the previous (n−1) learned value includes a pressure of positive five hPa (+5 hPa), then the numerical difference would be ((+5 hPa)−(−1 hPa)), and would equal positive six hPa (+6 hPa). Similarly, if the current (n) learned value includes a pressure of positive five hPa (+5 hPa), and the previous (n−1) learned value includes a pressure of negative two hPa (−2 hPa), then the numerical difference would be calculated as ((−2 hPa)−(+5 hPa)), and would equal negative seven hPa (−7 hPa).

The absolute value of the numerical difference between the current (n) learned value of the differential pressure sensor 32 and the previous (n−1) learned value of the differential pressure sensor 32 is then taken. For example, if the numerical difference between the current (n) learned value and the previous (n−1) learned value is equal to positive six hPa (+6 hPa), then the absolute value of the numerical difference is equal to six hPa (6 hPa). Similarly, if the numerical difference between the current (n) learned value and the previous (n−1) learned value is equal to negative seven hPa (−7 hPa), then the absolute value of the numerical difference is equal to seven hPa (7 hPa).

Figure 3:
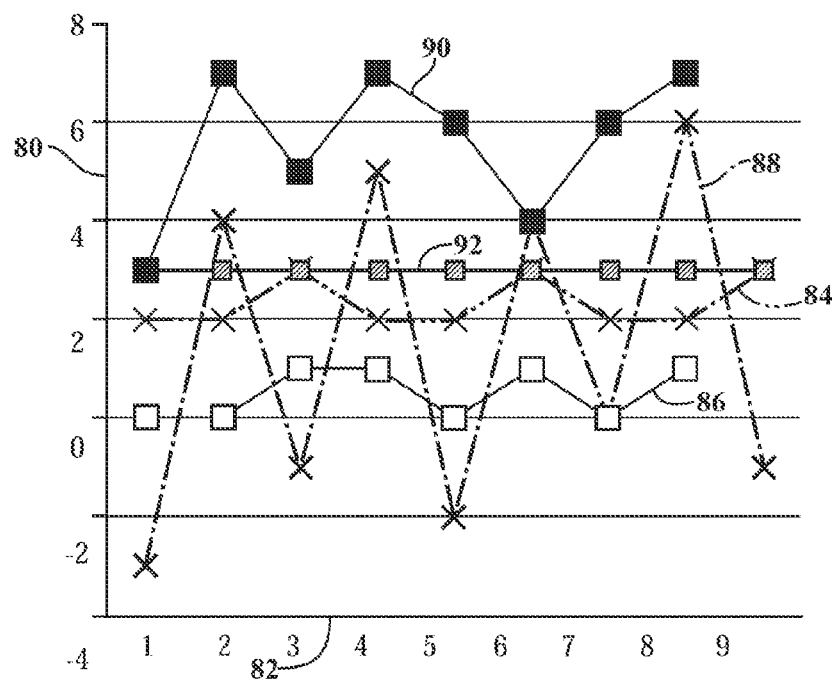
FIG. 3 is graph showing learned values from a differential pressure sensor of an exhaust gas aftertreatment system of a vehicle for a plurality of after-run occurrences of the vehicle.

Referring to FIG. 3, a pressure value of various differential pressure sensor measurements is indicated along a vertical axis 80 in hPa, and a sample number is indicated along a horizontal axis 82. Within FIG. 3, a first data line 84 represents nominal or normal learned values of the differential pressure sensor 32 when functioning properly. A second data line 86 represents the absolute value of the difference, i.e., delta, of the learned values of the first data line 84, i.e., the nominal learned values. A third data line 88 represents learned values of the differential pressure sensor 32 when not functioning properly, i.e., when malfunctioning. A fourth data line 90 represents the absolute value of the delta of the learned values of the third data line 88, i.e., the faulty learned values. As clearly shown in FIG. 3, the absolute value of the rate of change of the nominal learned values, shown in the second data line 86, is less than the actual values of the nominal learned values, shown in the first data line 84, whereas the absolute value of the rate of change of the faulty learned values, shown in the fourth data line 90, is higher than the actual values of the faulty learned values shown in the third data line 88, and noticeably higher than the actual values of the nominal learned values shown in the second data line 86.

The threshold pressure value 92 is defined to include a value that is approximately equal to the sum of an expected learned value of the differential pressure sensor 32, i.e., a nominal value of the learned value of the differential pressure sensor 32, and a pre-defined offset tolerance of the differential pressure sensor 32. It is expected that the normally functioning differential pressure sensor 32 will provide a consistent learned value for each after-run occurrence. For example, the differential pressure sensor 32 may be expected to provide a learned value of approximately equal to, but not limited to, two hPa (2 hPa). It should be appreciated that each differential pressure sensor 32 is different, and the expected value of each differential pressure sensor 32 may differ from the exemplary example provided above. The expected learned value of the differential pressure sensor 32 may vary slightly within a tolerance of the differential pressure sensor 32. For example, a tolerance of the differential pressure sensor 32 may include a tolerance of between zero hPa (0 hPa) and one and a half hPa (1.5 hPa). Accordingly, the expected nominal or normal learned value of a properly functioning differential pressure sensor 32 may vary between, for example, one half hPa (0.5 hPa) and three and a half hPa (3.5 hPa). The threshold pressure value 92 is defined to include a value that is equal to or greater than the expected nominal learned value of the properly functioning differential pressure sensor 32. Referring to FIG. 3, the threshold pressure value 92 is defined to include a value equal to three hPa (3 hPa). In addition to varying within the tolerance of the differential pressure sensor 32, the expected nominal learned values from the differential pressure sensor 32 may incrementally increase over long periods of time, e.g., over years. For example, the expected nominal learned value of the differential pressure sensor 32 may increase over time from an initial value of two hPa (2 hPa) to a higher value of, for example, six hPa, (6 hPa).

Referring back to FIG. 2, the absolute value of the rate of change of the learned values of the differential pressure sensor 32 is compared to the threshold pressure value 92 to determine if the absolute value of the rate of change of the learned values is greater than the threshold pressure value 92, or is less than the threshold pressure value 92, generally indicated by box 64. The absolute value of the rate of change of the learned values being greater than the threshold pressure value 92 indicates that the learned values from the differential pressure sensor 32 are varying more than the expected tolerance of the differential pressure sensor 32, and indicate that the differential pressure sensor 32 may not be functioning properly. Accordingly, when the absolute value of the rate of change of the learned values is less than the threshold pressure value 92, indicated at 66, then the control module 38 may register a pass, generally indicated by box 68. Alternatively when the absolute value of the rate of change of the learned values is greater than the threshold pressure value 92, indicated at 70, a fault in the differential pressure sensor 32 may be signaled, generally indicated by box 72. Preferably, the fault is only signaled when the absolute value of the rate of change of the learned values of the pressure sensor is determined to be greater than the threshold pressure value 92 for at least two consecutive after-run occurrences. The control module 38 may signal the detected fault in any suitable manner, such as by illuminating a warning light, or registering an error code in the memory of the control module 38. Because a faulty signal from the differential pressure sensor 32 may cause the particulate filter 26 to fail a diagnostic test, identifying and signaling the detected fault in the differential pressure sensor 32 prior to the particulate filter 26 failing a diagnostic test, allows a technician to service and/or replace the differential pressure sensor 32 instead of the more costly particulate filter 26.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of monitoring a differential pressure sensor of an exhaust gas aftertreatment system of a vehicle used to treat a flow of exhaust gas from an engine, the method comprising:
   sensing a learned value (n−1, n, n+1, n+2, etc.) of the differential pressure sensor for each after-run occurrence of the vehicle;
   calculating an absolute value of a rate of change between a current (n) learned value of the differential pressure sensor and a previous (n−1) learned value of the differential pressure sensor;
   comparing the absolute value of the rate of change of the learned values of the differential pressure sensor to a threshold pressure value to determine if the absolute value of the rate of change of the learned values is greater than the threshold pressure value or is less than the threshold pressure value; and
   signaling a fault in the differential pressure sensor when the absolute value of the rate of change of the learned values is greater than the threshold pressure value.

2. A method as set forth in claim 1 further comprising enabling a monitoring algorithm of a control module when the vehicle is in an after-run state, no inhibiting conditions are detected, and at least one previous (n−i) learned value of the differential pressure sensor is less than the threshold pressure value.

3. A method as set forth in claim 2 further comprising detecting the existence of at least one inhibiting condition prior to enabling the monitoring algorithm.

4. A method as set forth in claim 3 wherein the at least one inhibiting condition includes at least one of a temperature of exhaust gas within the exhaust gas aftertreatment system being outside a pre-defined range of temperatures, or an ambient air temperature being less than a pre-defined minimum temperature.

5. A method as set forth in claim 4 wherein the pre-defined range of temperatures includes a temperature range between 0° C. and 300° C.

6. A method as set forth in claim 4 wherein the pre-defined minimum temperature includes a temperature equal to −40° C.

7. A method as set forth in claim 1 further comprising saving in memory each of the learned values (n−1, n, n+1, n+2, etc.) for each after-run occurrence.

8. A method as set forth in claim 1 further comprising defining the threshold pressure value to include a value equal to the sum of an expected learned value of the differential pressure sensor and a pre-defined offset tolerance of the differential pressure sensor.

9. A method as set forth in claim 1 wherein calculating the absolute value of the rate of change of the learned values (n, n−1) of the differential pressure sensor includes calculating a numerical difference between the current (n) learned value of the differential pressure sensor and the previous (n−1) learned value of the differential pressure sensor.

10. A method as set forth in claim 9 wherein calculating the absolute value of the rate of change of the learned values (n, n−1) of the differential pressure sensor includes taking the absolute value of the numerical difference between the current (n) learned value of the differential pressure sensor and the previous (n−1) learned value of the differential pressure sensor.

11. A method as set forth in claim 1 wherein signaling a fault in the differential pressure sensor is further defined as signaling a fault in the differential pressure sensor when the absolute value of the rate of change of the learned values of the pressure sensor is determined to be greater than the threshold pressure value for at least two consecutive after-run occurrences.

12. A method as set forth in claim 1 further comprising providing a control module operable to monitor the differential pressure sensor.

13. A method of detecting a malfunction of a differential pressure sensor of an exhaust gas aftertreatment system of a vehicle used to treat a flow of exhaust gas from an engine, the method comprising:
   providing a control module operable to monitor the differential pressure sensor, wherein the control module is configured for:
      sensing a learned value (n−1, n, n+1, n+2, etc.) of the differential pressure sensor for each after-run occurrence of the vehicle in which no inhibiting conditions are detected;
      calculating a numerical difference between a current (n) learned value of the differential pressure sensor and a previous (n−1) learned value of the differential pressure sensor;
      calculating an absolute value of the numerical difference between the current (n) learned value of the differential pressure sensor and the previous (n−1) learned value of the differential pressure sensor to define an absolute value of a rate of change between the learned values (n, n−1) of the differential pressure sensor;
      comparing the absolute value of the rate of change of the learned values of the differential pressure sensor to a threshold pressure value to determine if the absolute value of the rate of change of the learned values is greater than the threshold pressure value or is less than the threshold pressure value; and
      signaling a fault in the differential pressure sensor when the absolute value of the rate of change of the learned values is greater than the threshold pressure value.

14. A method as set forth in claim 13 wherein the control module is configured for detecting the existence of at least one inhibiting condition prior to sensing a learned value of the differential pressure sensor for an after-run occurrence.

15. A method as set forth in claim 13 wherein the at least one inhibiting condition includes at least one of a temperature of exhaust gas within the exhaust gas aftertreatment system being outside a pre-defined range of temperatures, or an ambient air temperature being less than a pre-defined minimum temperature.

16. A method as set forth in claim 15 wherein the pre-defined range of temperatures includes a temperature range between 0° C. and 300° C.

17. A method as set forth in claim 15 wherein the pre-defined minimum temperature includes a temperature equal to −40° C.

18. A method as set forth in claim 13 wherein the control module is configured for saving in memory each of the learned values (n−1, n, n+1, n+2, etc.) from the differential pressure sensor for each after-run occurrence.

19. A method as set forth in claim 13 wherein the control module is configured for defining the threshold pressure value to include a value equal to the sum of an expected learned value of the differential pressure sensor and a pre-defined offset tolerance of the differential pressure sensor.

20. A method as set forth in claim 13 wherein signaling a fault in the differential pressure sensor is further defined as signaling a fault in the differential pressure sensor when the absolute value of the rate of change of the learned values of the pressure sensor is determined to be greater than the threshold pressure value for at least two consecutive after-run occurrences.

* * * * *